May 20, 1969     B. J. GAFFNEY     3,444,956

FOAM SURFACED ACOUSTICAL BODY

Filed Feb. 8, 1966

Inventor
Dr. Bernard James Gaffney by W. Bartlett Jones,
Attorney

United States Patent Office 3,444,956
Patented May 20, 1969

3,444,956
FOAM SURFACED ACOUSTICAL BODY
Bernard James Gaffney, Stillwater, Minn., assignor to Conwed Corporation, St. Paul, Minn., a corporation of Delaware
Filed Feb. 8, 1966, Ser. No. 525,896
Int. Cl. G10k 11/04; E04b 1/99
U.S. Cl. 181—33                                    7 Claims

ABSTRACT OF THE DISCLOSURE

An acoustical panel for use on ceilings, walls, and the like comprised of a body layer of porous material, preferably fiberboard, and a surface layer of open-cell foam and in which there are a multiplicity of acoustical openings through the foam and into the body layer which openings at the surface are closed by the resiliency of the foam.

---

The present invention relates to acoustical panels for sound-absorption. In particular, it relates to punched or drilled acoustical fiberboard panels having an open-cell sound-transmitting foam layer over the sound-receiving face of the fiberboard.

The invention is based upon the discovery that a porous fiberboard which can be rendered highly absorptive of sound by punching or drilling holes therein, can be covered by a secured layer of open-cell elastic foam, and then rendered highly absorptive of sound by perforating it with pin punches through the foam without forming visible openings in the foam. The punches rupture cell walls in the foam, but the elasticity of the foam returns the ruptured walls to their original position making the region of entry at the surface of the foam invisible. As a result, the unperforated appearance of the surface of the foam layer is retained.

Because such an open-cell foam transmits sound, the perforations into but not through the fiberboard perform their normal function of leading sound into the porous boards. The sound reaches the perforations through the layer of open-cell foam, which of itself also has sound-absorbency capacity.

As a result of the foregoing it becomes possible to provide a fiberboard panel with many more sound-absorbing openings than can be aesthetically tolerated when the same are exposed to vision. The more openings in a panel the greater its sound-absorbing capacity. Heretofore, the decorative appearance in punched or drilled panels is a limiting factor in the number of openings and hence in the sound-absorbing capacity.

The discovery referred to above, however, is not a limitation of the invention and leads to other embodiments, which may have sound-absorbing bodies other than fiberboard, such as acoustical bodies of perlite, vermiculite and other porous mineral compositions.

Accordingly, it is the general object of the present invention to provide porous sound-absorbing sheet material with a multiplicity of sound-receiving openings from one face thereof into but not through the sheet material, and hiding the openings by a covering layer of open-cell sound-transmitting foam presenting an attractive face for exposure to vision and to the receipt of sound.

The invention in various of its aspects is shown in the accompanying drawings, in which.

The foam layer may be preformed and then adhesively secured to a rigid porous fiberboard which may be already perforated by drilling or punching, and having more perforations than can be aesthetically tolerated if visible when in use. Care must be taken that the adhesive layer does not obstruct communication between the perforations and the open cells of the foam. Thus, to apply a layer of adhesive to the foam and then cementing the foam to the perforated fiberboard, will to a considerable degree obstruct such communication. But, to apply adhesive to the perforated face of the fiberboard requires care not to apply it over or in the holes. In such a case of adhesively applying performed open-cell foam to a face having a multiplicity of visible acoustical openings into the board, there are no ruptured cells in the foam, and there is no obstruction of communication from the foam into the openings. Nevertheless, the adhesive, however applied, minimizes communication from the foam into the unperforated areas of the fiberboard.

However, it is preferred to form the openings in the board by punching pins through the elastic foam, so that the path of the pins in the foam closes on withdrawing the pins. The cell walls thus broken are more vibratile than unbroken cell walls, thus adding an increment of sound-absorbing capacity.

The preferred method of combining board and foam is to apply a layer of fluid frothed latex to an unperforated fiberboard then to cure the latex froth in situ, and then to punch the fiberboard, through the elastic foam as described. But to form foam on a punched or perforated face of fiberboard results in filling at least the upper parts of the holes with latex froth, thus decreasing the desired function of the perforations and decreasing the capacity of the substrate board to absorb sound. By so casting latex no adhesive is used, and where the face of the fiber sheet is porous there is communication for transmission of sound across the interface at unperforated areas.

Figure 1:
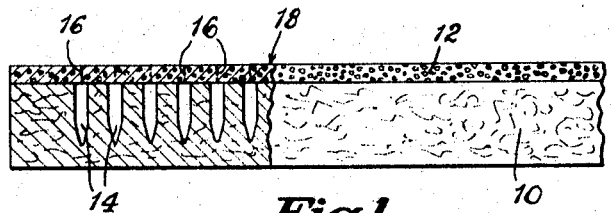
FIG. 1 shows in cross-section a rigid porous fiberboard with a covering foam layer cast on the board through which layer pins have punched the openings shown in the board.

FIG. 1 shows a porous fiberboard 10 on which has been cast a layer of aqueous latex froth, such as a copolymer of butadiene and styrene, which cures to a flexible open-cell foam with a velvety feeling surface. The cured foam 12 is firmly bonded to the board 10, with open cells at the interface and at the surface. Then a multiplicity of holes, such as 14, is punched into the board through the foam. The paths of the pins through the foam are represented by dotted lines 16, exhibiting no hole at the face 18.

Figure 2:
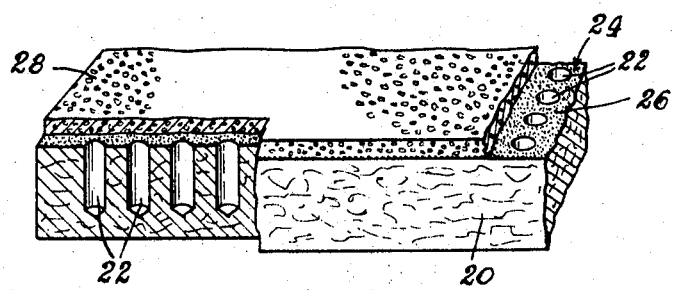
FIG. 2 shows in cross-section and in perspective a rigid porous fiberboard with drilled holes, covered by a layer of open-cell foam.

FIG. 2 represents fiberboard 20 which is first drilled with a multiplicity of holes 22. Then its drilled face 24 is coated with adhesive 26 avoiding adhesive in or over the holes. To the adhesive-covered face is applied a layer of open-cell foam 28, which in this instance may be rigid or flexible.

Figure 3:
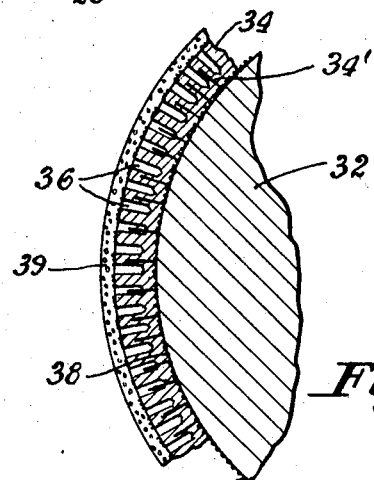
FIG. 3 shows in cross-section a portion of a curved wall covered with a flexibilized fiberboard having sound-absorbing holes therein of which the openings are covered by a layer of flexible open-cell foam.

FIG. 3 represents the use of fiberboard having a flexible open-cell foam, as a covering for a curved wall 30, such as a column 32. The fiberboard 34 with punched or drilled holes 36, is kerfed from the back by cuts 34' to render it flexible. When applied to the column 32 it is cemented by adhesive 38 to the wall 30. To the extent that kerfs 34' may merge with openings 36 there is added sound-absorbing capacity. The board 34 is lined over the holes with a flexible open-cell foam 39. In a use such as in FIG. 3 it is preferred not to punch the holes through the foam because in application as shown, the foam is stretched to a degree and the points of entry of the pins may open sufficiently to be visible. The foam 39 may be a layer cast on the board 34 or applied by adhesive, as described, either before or after attaching the board to the column.

Figure 4:
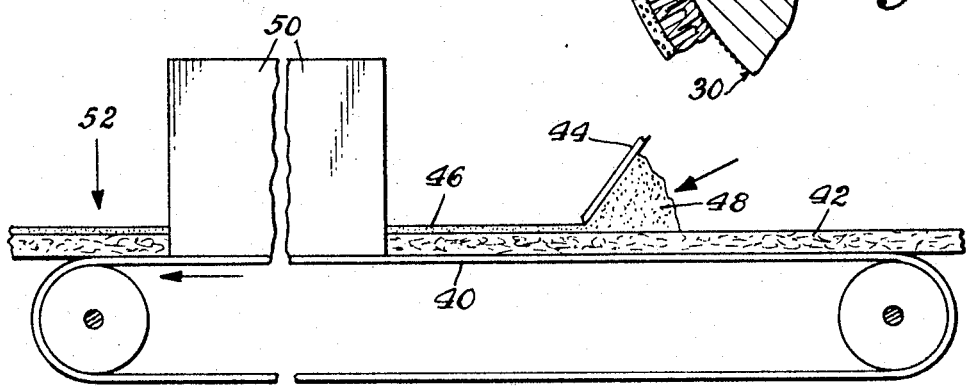
FIG. 4 shows diagrammatically the coating of frothed latex on a moving fiber sheet, and converting the latex to finished foam.

FIG. 4 shows a conveyer 40 carrying a sound-absorbing sheet 42, preferably fiberboard. Over it is a doctor blade 44 at a height to predetermine a thickness for a layer 46 of foamed latex 48 maintained in supply behind a doctor blade 44. The conveyor carries the latex covered sheet 42 through a drying oven 50 to cure the foam, discharging a product 52 which can then be punched through the foam.

Figure 5:
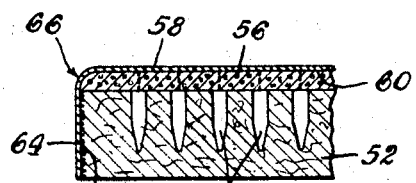
FIG. 5 shows an article with the foam covered by a vibratile film.

FIG. 5 shows in cross-section a portion of a rigid tile or panel of a foam-covered acoustical body, represented as fiberboard, over which a vibratile film is used to present a different texture or appearance. Such a film transmits sound beyond it into and through the foam to the body. In FIG. 5, the exemplary fiberboard 52, such as a square tile, with holes 54 punched through a flexible open-cell foam layer 56 is covered with a vibratile film 58 which may be opaque or embossed, or colored, held taut and unsecured over the face 60 of the foam and secured to the side edges 62 of the board by adhesive 64, thus rounding the edges 66 by compressing the foam layer 56. Such a film is more readily cleaned than is a foam surface.

As indicated, the invention is not limited to flexible foam, nor to latices which produce flexible foams, nor to depositing a frothed latex on the fiber sheet. A vinyl chloride latex is preferred for producing a foam having fire-retardancy. An acrylic copolymer with vinyl chloride is preferred for better light stability. Pigments in the cell walls of the foam may be produced by adding them to the latex up to an equal weight of the latex solids content without impairing the functions of the foam, thus lowering the cost of a unit volume of foam. A pigmented styrene-butadiene foam has a density of about 6 lbs. per cu. ft. A vinyl chloride foam has a density of 10 to 12 lbs. per cu. ft.

Polyurethane foams may be rigid or flexible, but these are not derived from a latex. They are formed by mixing two liquids, preferably on a conveyer on which they react liberating gas which creates the foam. Known compositions and processing for producing polyurethane foams can produce open-cell foams suitable for the present invention, however, with a skin which can be sliced away.

Because the foam, even though it is sound-transmitting and sound-absorbing, is also resistant to the transmission of sound, the layer of foam is relatively thin compared to the thickness of the sheet, for example ⅛-inch thick on a board ⅝-inch thick. Thus, a layer of foam over an acceptable aesthetically perforated fiberboard lessens the sound-absorption effected by the fiberboard without the foam. According to the present invention, the presence of many more perforations invisible under the foam compensates for this and can even serve to to increase the sound-absorbing capacity of the laminated product. For example, a board loaded with openings 3/32-inch in diameter on ¼-inch centers is not acceptable for aesthetic exposure, and according to this invention, it may be used acoustically when covered by a thin layer of foam.

From the foregoing it is apparent that numerous changes and modifications of the illustrative detail may be made without departing from the invention as expressed in the appended claims.

I claim:
1. The method comprising casting a layer of liquid frothed latex which cures to an open-cell elastic foam onto the face of a porous body characterized by sound-absorbing capacity when provided with a multiplicity of sound-absorbing openings into but not through the body, curing the foam by drying the same with heat, pin-punching a multiplicity of said sound-absorbing holes into said body through the cured foam, and withdrawing the pins, whereby the elasticity of the foam on withdrawal of the pins closes the path traversed by the pins.

2. An acoustical material consisting essentially of a porous sound-absorbing body having a multiplicity of sound-absorbing openings thereinto from a face thereof, a hiding layer of flexible open-cell foam secured to said face and having communication for sound therethrough to the said openings in the fiber sheet, said layer of foam having a thickness appreciably less than the thickness of the fiber sheet, and secured to said body and unsecured over said foam a vibratile film covering said foam.

3. An acoustical panel for sound absorption comprising an internally porous body, a layer of resilient open-cell foam extending over substantially one entire face of said body and secured to said face, a multiplicity of acoustical openings extending entirely through said layer of foam and extending into but not through said body, and said openings at the front face of said foam being closed by the resiliency of said foam, whereby said acoustical openings are rendered substantially invisible at the exposed face of said panel.

4. The acoustical panel of claim 3 in which said body is a felted fiberboard.

5. The acoustical panel of claim 3 in which the thickness of the foam layer is appreciably less than the thickness of said fiberboard body.

6. The acoustical panel of claim 3 in which said foam layer is secured to said fiberboard body by a layer of adhesive.

7. The acoustical panel of claim 3 in which said foam layer is secured to said fiberboard body by the cured foam itself.

References Cited

UNITED STATES PATENTS

| 1,832,571 | 11/1931 | Nash. |
| 1,900,522 | 3/1933 | Sabine. |
| 1,946,914 | 2/1934 | New. |
| 2,768,091 | 10/1956 | Cubberley. |
| 3,025,197 | 3/1962 | Sheidley. |

FOREIGN PATENTS

| 1,137,584 | 1/1957 | France. |
| 955,632 | 1/1957 | Germany. |
| 863,611 | 3/1961 | Great Britain. |
| 948,703 | 2/1964 | Great Britain. |
| 963,632 | 7/1964 | Great Britain. |

ROBERT S. WARD, JR., *Primary Examiner.*

U.S. Cl. X.R.

156—148; 161—113, 159